United States Patent [19]
Levy

[11] Patent Number: 5,708,522
[45] Date of Patent: Jan. 13, 1998

[54] ANTIGLARE OPTICAL DEVICE

[76] Inventor: George S. Levy, 3980 Del Mar Meadows, San Diego, Calif. 92130

[21] Appl. No.: 673,569

[22] Filed: Jul. 1, 1996

Related U.S. Application Data

[63] Continuation-in-part of Ser. No. 355,075, Dec. 13, 1994, Pat. No. 5,541,762, which is a continuation-in-part of Ser. No. 317,137, Sep. 26, 1994, abandoned, which is a continuation-in-part of Ser. No. 11,743, Feb. 1, 1993, Pat. No. 5,351,151.

[51] Int. Cl.$^6$ ................................................. G02B 27/10
[52] U.S. Cl. .................. 359/240; 359/265; 359/237; 359/298; 359/238; 359/239; 359/242
[58] Field of Search ................................. 359/240, 237, 359/265, 238, 239, 298; 348/115

[56] References Cited

U.S. PATENT DOCUMENTS

| | | | |
|---|---|---|---|
| 4,447,128 | 5/1984 | Ferror | 350/174 |
| 5,414,461 | 5/1995 | Kishi et al. | 348/115 |
| 5,541,762 | 7/1996 | Levy | 359/240 |

*Primary Examiner*—Viet Q. Nguyen
*Attorney, Agent, or Firm*—John R. Ross

[57] ABSTRACT

A viewing device that selectively attenuates light from bright objects, leaving light from dim objects substantially unaffected. The invention comprises an array of optical systems each of which contains one or more focusing elements which focus an image of the object field onto a focal plane, and one or more eyepiece elements for viewing portions of the focused image. The optical systems in the array are aligned to permit the viewed portions to be seen coherently to form a composite view of the object field. A photoactive layer is located at the focal plane. The photoactive layer may be a photochromic system that darkens when exposed to intense light and returns to the clear state when the intensity is substantially reduced. The light path through the device is folded using optical elements such as mirrors or prisms to minimize the size of the device. The photoactive layer may be a system of several layers functioning as a light valve. A preferred embodiment utilizes a liquid crystal in contact with a photoconductive layer to provide the photoactive layer. Preferred embodiments of the invention are utilized to provide a motor vehicle rearview mirror and a forward looking visor.

34 Claims, 18 Drawing Sheets

ANTIGLARE OPTICAL DEVICE

This application is a continuation-in-part of U.S. patent application Ser. No. 08/355,075 filed on Dec. 13, 1994, now U.S. Pat. No. 5,541,762, which was a continuation in part of Ser. No. 08/317,137 filed on Sep. 26, 1994, , now abandoned, which was a continuation in part of Ser. No. 08/011,743 filed Feb. 1, 1993, now U.S. Pat. No. 5,351,151. This invention relates to optical instruments for viewing an object field containing one or more intense light sources, and more particularly, to optical instruments such as binoculars, rearview mirrors, welding visors, spacesuit goggles and periscopes.

BACKGROUND OF THE INVENTION

Directing an optical instrument such as binoculars toward an intense light source such as the sun can be very hazardous to the eyes. In astronomical instruments used to view an object field containing the sun, this problem is sometimes solved by placing in the focal plane inside the instrument, an opaque disk positioned exactly at the focused image of the sun. The disk has the same dimension as the image of the sun and thus blocks out the solar rays. In energy detection devices such as the ones described in U.S. Pat. No. 3,020, 406 by T. R. Whitney and U.S. Pat. No. 3,714,430 by R. C. Finvold, a photochromic layer is placed at the focal plane of the device in order to protect sensitive photodetectors. The high energy rays cause the photochromic material to increase in opacity at those points where the rays are most intense. Thus, high intensity rays are attenuated by the same dark spots they generate, and dim rays are left unaffected.

These prior art devices make use of photochromic material such as germanium and gallium arsenide, which are sensitive to infrared radiation. These devices are specifically designed to protect inanimate energy detectors and transducers.

There is a need to reduce glare in conventional instruments such as rearview mirrors, binoculars, welding visors and periscopes, and specifically, to protect human vision from high intensity light sources such as the sun, car headlights and welding arcs. In addition, the size of the instruments should be minimized by folding the optical path. As is well known in optics, this can be achieved by the use of prisms and mirrors. The size can also be reduced by using several such instruments arranged in array formation.

In this application, I use the term photochromic to refer to materials or systems which become less transparent when exposed to high intensity light. I use the term photoactive to refer to materials or systems which undergo changes in any of their optical properties when exposed to light.

SUMMARY OF THE INVENTION

The present invention provides a viewing device that selectively attenuates light from bright objects, leaving light from dim objects substantially unaffected. The invention comprises an array of optical systems each of which contains one or more focusing elements which focus an image of the object field onto a focal plane, and one or more eyepiece elements for viewing portions of the focused image. The optical systems in the array are aligned to permit the viewed portions to form a composite view of the object field and be seen coherently. A photoactive layer is located at the focal plane. The photoactive layer may be a photochromic system that darkens when exposed to intense light and returns to the clear state when the intensity is substantially reduced. The light path through the device is folded using optical elements such as mirrors or prisms to minimize the size of the device. The photoactive layer may be a system of several layers functioning as a light valve. A preferred embodiment utilizes a liquid crystal in contact with a photoconductive layer as the photoactive layer. Preferred embodiments of the invention are utilized to provide a motor vehicle rearview mirror and a forward looking visor.

DETAILED DESCRIPTION OF PREFERRED EMBODIMENTS

The present invention can be described by reference to the drawings.

Antiglare Simple Inverting Telescope

Figure 1A:
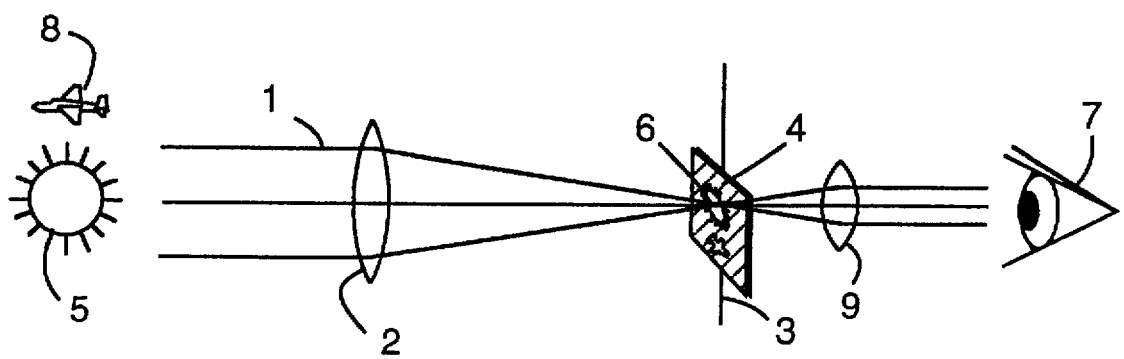
FIG. 1A is a drawing shows the basic principle of the antiglare device which consists of an inverting telescope equipped with an photochromic layer in the focal plane between the two lenses.

FIG. 1A provides an illustration of the idea at the base of this invention. It shows a simple inverting telescope modified to eliminate glare. Light rays 1 enter the objective lens 2 and are focused on a focal plane 3 which lies within a photochromic layer 4. Rays originating from an intense source such as the sun 5 create a dark spot 6 on the photochromic layer. This spot, in turn, substantially blocks out the light of the sun, permitting a viewer 7 to see an image of an airplane 8 flying at an angular position near the sun. The rays leave the telescope through the lens system 9 which in some preferred embodiment is referred to as an eyepiece, and enter the human eye 7.

The present invention utilize arrays of antiglare elements typified by the one shown in FIG. 1A. In addition, the optical path in each element is folded by means of prisms and/or mirrors. Each element of the array thus includes a set of optical components for directing, folding and focusing light, and a photoactive system layer located at the focal plane of each array element. I shall provide a detailed explanation of the following two subsystems: the optics including the optical arrays, mirrors and prisms, which shall be discussed first, followed by the photoactive system layer.

Optical System

Figure 1B:
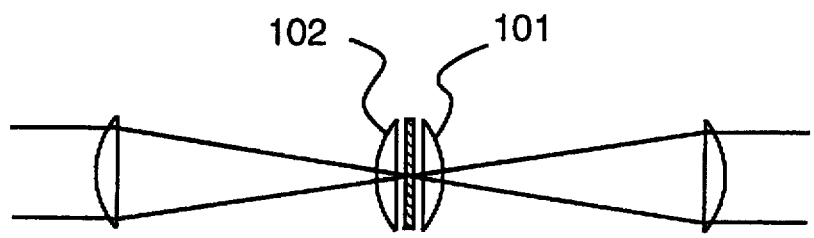
FIG. 1B illustrates how field lenses can be placed to increase the field of view.

Elaboration of the optical array elements are discussed below. As indicated in FIG. 1B, the device field of view for each element can be increased by using the well known technique of imaging the objective lens unto the eyepiece by means of field lenses 101 and 102.

The lenses do not have to be simple lenses as outlined above, but could be compound lenses, curved mirrors or Fresnel lenses or mirrors as needed, to improve the quality of the image, reduce aberrations and decrease the weight of the device.

Figure 1C:
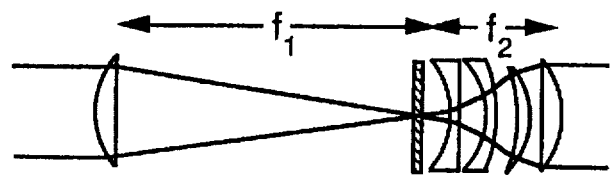
FIG. 1C describes how a compound lens design can reduce the length of the optical path without changing the device magnification.

Compound lenses can also reduce the effective focal length, $f_2$, as shown in FIG. 1C. This figure shows a telescope system with a magnification of unity in which one of the focal distances has been reduced by means of a compound lens arrangement.

Magnification of the image, other than unity may be desirable. For example, in the case of rearview mirrors, reduction of the image can provide a wider field of view. More generally, intentional distortion of the image can be of possible value as in the case of rearview mirror. In such systems, one area of the image is kept distortion-free. Distortion is applied to the remaining of the image to increase the effective field of view. Magnification and intentional distortion can easily be implemented by adjusting the optical parameters of lenses, mirrors and prisms of each element of the antiglare system, and the direction of the paraxial axis for each element.

To reduce the size of the device, the optical path could be folded by means of prisms or mirrors. Because of the high index of refraction of their constituent material, prisms can further reduce the length of the optical path and thus allow the construction of more compact devices. Mirrors, however, have the advantage of providing low weight design solutions. In the description of specific embodiments, we shall explain how means such as mirrors and prisms can be used to reduce the dimensions of the device. Prisms and/or mirrors have the added function of erecting the image reinverted by the convex lenses or concave mirrors in the device.

As shall be described in the specific embodiment below, these same principles can be used in applications such as rearview mirrors and visors.

Description of Preferred Photochromic System

Preferred photochromic systems may comprise a single homogeneous layer or several layers which together possess a photochromic property. Multiple layer systems may offer better performance in terms of speed and sensitivity, than single layer systems composed of homogeneous material. I shall use the word layer to mean either a layer consisting of homogeneous material or a layer comprising of a layered system of multiple materials each material having a specific function.

Figure 2A:
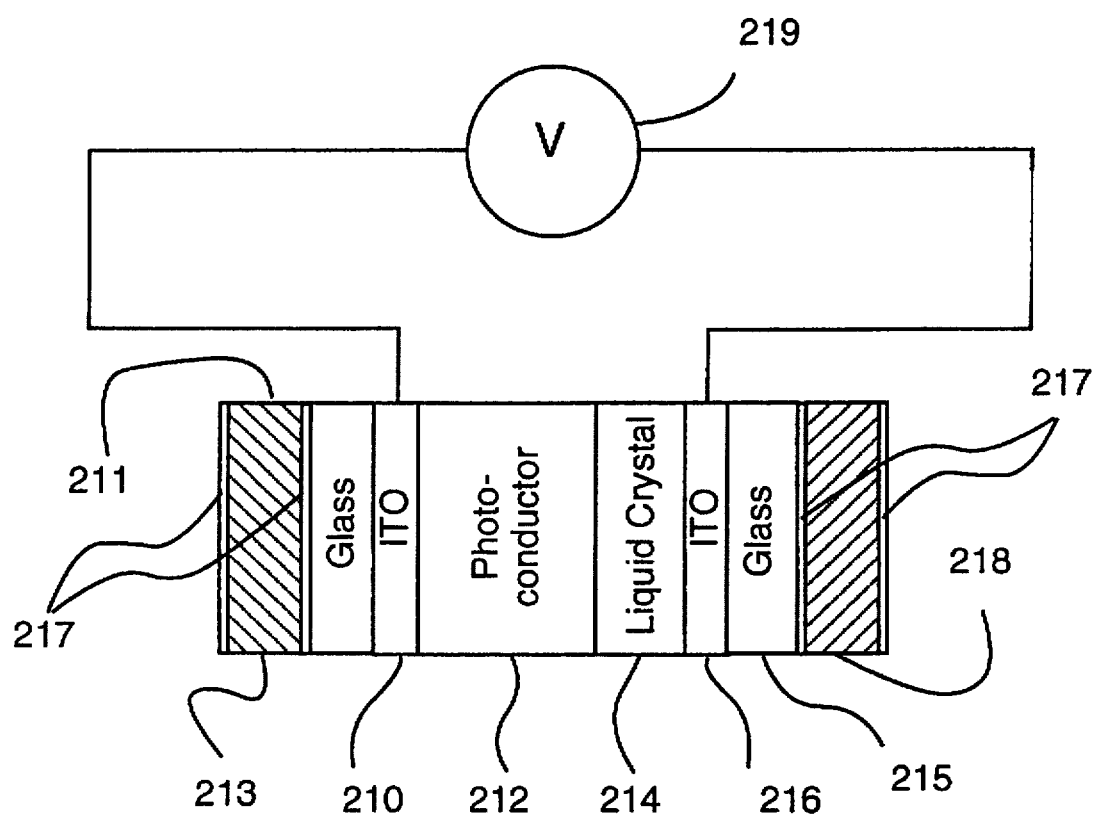
FIG. 2A illustrates the construction of a photochromic layered system using a liquid crystal.

Photochromics Using Assemblies of Optically Active Materials and Photoconductive Materials A preferred photochromic system shown in FIG. 2A uses optically active materials in conjunction with polarizers. This arrangement bears a certain resemblance to the Hughes Liquid Crystal Light Valve discussed in *Fundamentals of Photonics* by Saleh and Teich, Wiley Interscience, page 728, except that no mirror and optical isolator is used. An advantage of using a liquid crystal technique is that applied voltage can be used to turn on or off, or otherwise gradually control the photochromic functionality of the device.

This system comprises the following layers arranged in a stack:

1) A transparent electrode 210 made of material such as Indium Tin Oxide (ITO), supported by glass plate 213,
2) A photoconductive layer 212 made of material such as Selenium, Zinc Selenide, Selenium doped with Tellurium, Bismuth Silicon Oxide ($Bi_{12}Si\ O_{20}$) or a transparent organic photoconductor,
3) An optically active layer 214 made of liquid crystal consisting of a "twisted" nematic layer with a twist of 90 degrees.
4) A second transparent electrode 216 of ITO supported by glass plate 215.
5) The surfaces of glass plates 215 are coated with antireflection coatings 217 to reduce reflections inside the device, or with other suitable protective coating which may, for example, absorb infrared or ultraviolet radiation.

It is known to experts in the field of liquid crystals that the surfaces in contact with the liquid crystal may have to be coated with chemicals such as polyimides, and rubbed if alignment of the liquid crystal molecules in contact with the surfaces is desired. It is also known that the if the liquid crystal is in contact with a material such as a photoconductor and if a chemical reaction can occur between the liquid crystal and the material, then a passivation layer such as silicon dioxide can be used to coat the material. Such a layer has the added benefit of preventing short circuits across the liquid crystal layer. These techniques are well known in the field of liquid crystals.

The above system is enclosed between two crossed polarizers 218 and 211. Therefore, rays which are not rotated in polarization by the liquid crystal, are substantially attenuated by the second polarizer on their path. The polarizers must be located on each side of the aforementioned layers, along the optical axis. They may be in contact with the layer assembly as shown in the figure, or, more generally, elsewhere on the optical axis of the instrument. The applied voltage must follow the drive requirements for liquid crystals to avoid electrolysis of the solution.

A controllable electric power source 219 is applied across the electrodes and an electric field develops across the photoconductive and liquid crystal layers. When exposed to light, the photoconductive material becomes conductive in proportion to the intensity of the incident light. The voltage can be adjusted to provide 90° rotation at very low light levels and minimum rotation at very high light intensity. As a result, a spatial pattern of conductance is formed in the photoconducting layer, that alters the electric field across the liquid crystal. Consequently, the liquid crystal rotates the plane of polarization of light as an inverse function of the incident light intensity.

The above example describes how a liquid crystal in conjunction with polarizers can be used to construct a photochromic system. The use of polarizers, however, results in the loss of at least 50% of the light. Other methods explained below do not need polarizers. These techniques are well known and are described in technical literature on optics such as the *Handbook of Optics*, Volume II, Michael Bass Ed., 1995, Chapter 14, and the periodicals *Liquid Crystals*, and *Molecular Crystals and Liquid Crystals*. These methods rely on scattering or absorption of light by liquid crystals. Some of the most interesting approaches include the following:

1) Guest-host effect
2) Polymer-dispersed liquid crystals (PDLC)
3) Polymer stabilized liquid crystals (PSLC)

Guest-host systems are formed by dissolving a few percent of dichroic dye or more generally, pleochroic dye in the liquid crystal. Changes in the orientation of the liquid crystal molecules in response to an electric field results in changes in orientation of the dye, and changes in color or opacity. Systems operating in positive mode also called reverse mode, that increase in opacity with the electric field, have been constructed (Bahadur et al., 13th International Liquid Crystal Conference, Vancouver, BC, Canada, 22–27, Jul. 1990 and Molecular Crystal and Liquid Crystal, 1991, Vol. 209, pp 39–61, and Ivaschenko et al., 13th International Liquid Crystal Conference, Vancouver, BC, Canada, 22–27, Jul. 1990 and Molecular Crystal and Liquid Crystal, 1991, Vol. 202, pp 13–16).

Polymer-dispersed liquid crystals (PDLCs) modulate light by scattering it, as a function of the electric field. They consist of microscopic droplets of liquid crystal dispersed in a transparent polymer. The refractive index of the liquid crystal can be controlled by the application of an electrical field. At one field level, the refractive index is very close to that of the polymer matrix and the material is transparent. At a different field level, the refractive index is different and the material scatters light. Current PDLC devices operate in normal mode (scatter light when no field is present), but there is no theoretical reason why PDLC's could not be constructed to operate in reverse mode (scatter when a field is present. (Ma et al., Proceedings of SPIE, 1990, Vol. 1257, pp 46.).

Polymer Stabilized Liquid Crystals can also be used to modulate light by scattering. To prepare these materials, monomers in low concentration are dispersed in a liquid crystal. The monomers are then photopolymerized while the liquid crystal molecules are suitably aligned by a field. The function of the polymer is to hold in place the liquid crystal molecules. When a field is applied, the molecules change orientation and optical properties. The resulting material can operate in the negative mode (clear when the field is present and light scattering when the field is absent) or in the positive mode also called reverse mode (clear when the field is absent and light scattering when the field is present). (Yang et al., Applied Physics Letters, Vol. 60 No. 25, Jun. 22, 1992, pp 3102–3104 and Hikmet et al., Physical Review E, Vol 51, No. 6, pp 5824–5831).

The Liquid Crystal Dispersed Polymer, also called Liquid Crystal Gels systems contain a small amount of polymer in a matrix of liquid crystal (Jakli et al, Liquid Crystals 1995, Vol 18, No. 4, pages 601–605, and Hikmet, R.A.M., Liquid Crystals 1991, Vol 9, No. 3, pages 405–416). These systems can be transparent in the "off" state and translucent in the "on" state.

Many other variations exist for constructing light valves, as is well known by experts versed in this art and as described in the technical literature.

Several photoconducting materials are available, with different spectral sensitivities, transparencies to visible light and manufacturing application processes. For example, silicon is sensitive to infrared but opaque to visible radiation. Selenium is sensitive to blue and green light thus allowing only orange and red visible light to pass. Selenium's sensitivity can be pushed toward the blue by alloying it with zinc or adding tellurium as a dopant. The tendency of selenium to crystallize can be mitigated by the addition of arsenic. Organic semiconductors can also be used. For example, titanylphthalocyanine has a peak transparency around 485 nm (Fujikake et al., Japanese Journal of Applied Physics, 1995, Vol 34, Part 1, No. 8A, pp. 4067–4073.)

As is well known in the art, many other methods of constructing light valves have been developed. It is a purpose of this patent to utilize the functionality of light valves when these light valves are positioned at the focal plane of an optical system.

Figure 2B:
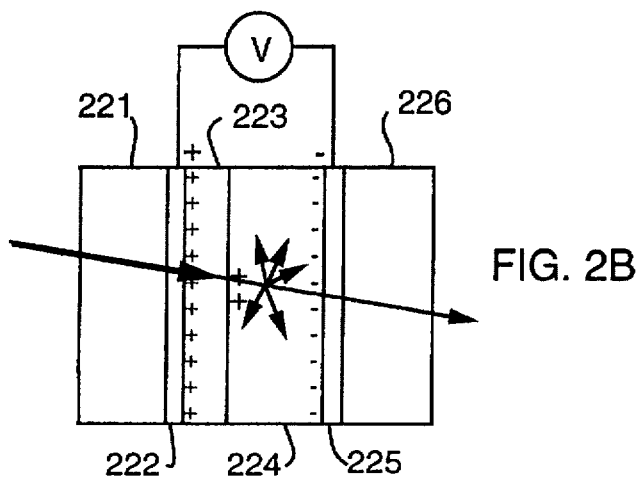
FIG. 2B describes a photochromic system using a liquid crystal and a photoconductor, that operates in the transmission mode, and that relies on controllable light scattering property of the liquid crystal.

FIG. 2B illustrates the principle of such a light valve adapted for the purpose of this invention to operate in the transmissive mode. It comprises a stack of the following materials:

1) A glass plate 221

2) A transparent electrode 222 consisting of Indium Tin Oxide (ITO)

3) A photoconductive material 223 transparent to visible light, consisting for example of selenium doped with tellurium or of zinc selenide or an organic photoconductor.

4) A liquid crystal layer 224 operating in positive mode using one of the scattering or absorption methods discussed above.

5) A second ITO transparent electrode 225

6) A second glass plate 226

Light enters the system through the transparent electrode 222 and traverses the photoconductive material 223 where it generates charge carriers. As these carriers migrate they create space charges on the surface of the liquid crystal system 224. This generates an electric field that changes the optical properties of the liquid crystal layer. As a result, the liquid crystal absorbs or scatters high intensity rays, but is transparent to low intensity light.

Figure 2C:
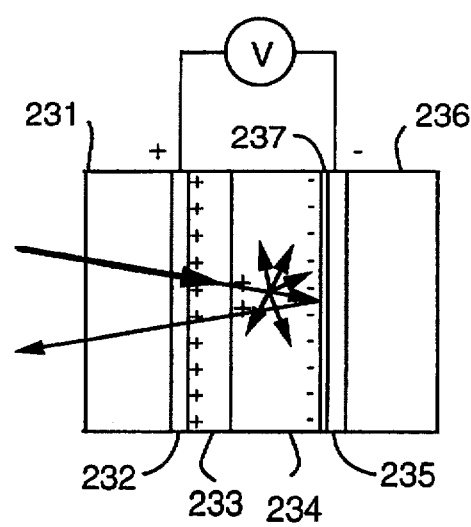
FIG. 2C shows a photochromic system using a photoconductor, a liquid crystal and a dielectric mirror, that operates in the reflection mode, and that relies on controllable light scattering property of the liquid crystal.
Figure 2D:
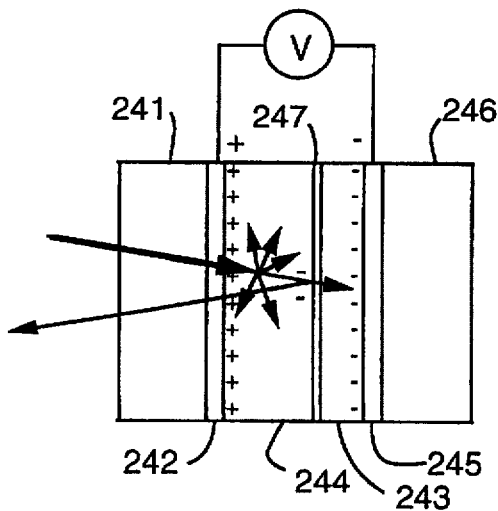
FIG. 2D illustrates a photochromic system using a photoconductor, a liquid crystal and a semitransparent dielectric mirror, that operates in the reflection mode and that relies on controllable light scattering property of the liquid crystal.

The next two figures, FIG. 2C and 2D describe how the photoactive layer can be made to reflect or scatter light as a function of said light input intensity. FIG. 2C consists of the following elements:

1) A glass plate 231

2) A transparent electrode consisting of Indium Tin Oxide (ITO) 232

3) A photoconductive material 233 transparent to visible light, consisting for example of selenium doped with tellurium, or of zinc selenide 4) A liquid crystal layer 234 operating in positive mode by varying the amount of scattering or absorption of light 5) A dielectric mirror 237 consisting of, for example, multiple layers of $HfO_2/SiO_2$ 6) An electrode 235

7) A substrate 236 made of plastic, metal or ceramic.

This system operates as the one above, except that, in this case, light is reflected by the dielectric mirror 237 and undergoes a second pass through the system.

A variation on the above design, shown in FIG. 2D, involves the following components:

1) A glass plate 241

2) A transparent electrode 242 consisting of Indium Tin Oxide (ITO)

3) A liquid crystal layer 244 operating in positive mode by scattering or absorbing light.

4) A semitransparent dielectric mirror 247 consisting of, for example, multiple layers of $HfO_2/SiO_2$.

5) A photoconductive layer 243 consisting of hydrogenated silicon.

6) An electrode 245

7) A substrate 246 made of plastic, metal or ceramic.

In this case the photoconductive material 243 is located behind the mirror 247 and can be made of a material such as silicon opaque to visible light. Light enters the system through the transparent electrode 241 and traverses the liquid crystal layer. As the light reaches the semitransparent mirror 247, most of it is reflected. Some light, however traverse the mirror and is captured by the photoconductive material 243 where it generates charge carriers. As these carriers migrate, they create space charges on the surface of the polymer-dispersed liquid crystal. The resulting electric field changes the optical properties of the liquid crystal. In turn the liquid crystal absorbs or scatters high intensity rays but is transparent to low intensity light. The semitransparent mirror can be made mostly reflective in the visible portion of the spectrum, and mostly transparent in the infrared portion. This design provides an optimum allocation of the spectrum. The silicon photoconductor receives the infrared rays to which it is sensitive. The remaining rays which am visible, am reflected toward the human viewer.

Protection of Sensitive Materials Against Ultraviolet Radiation

Materials used in the photochromic or optical systems may be susceptible to being damaged by certain radiations such as UV. In such a case, it is possible to prevent this damage by placing in front of the optical system, a suitable filter to stop harmful radiations from entering the optical system.

Photochromic Effect Implemented with Video Camera and Matrix Display Layer

Figure 2E:
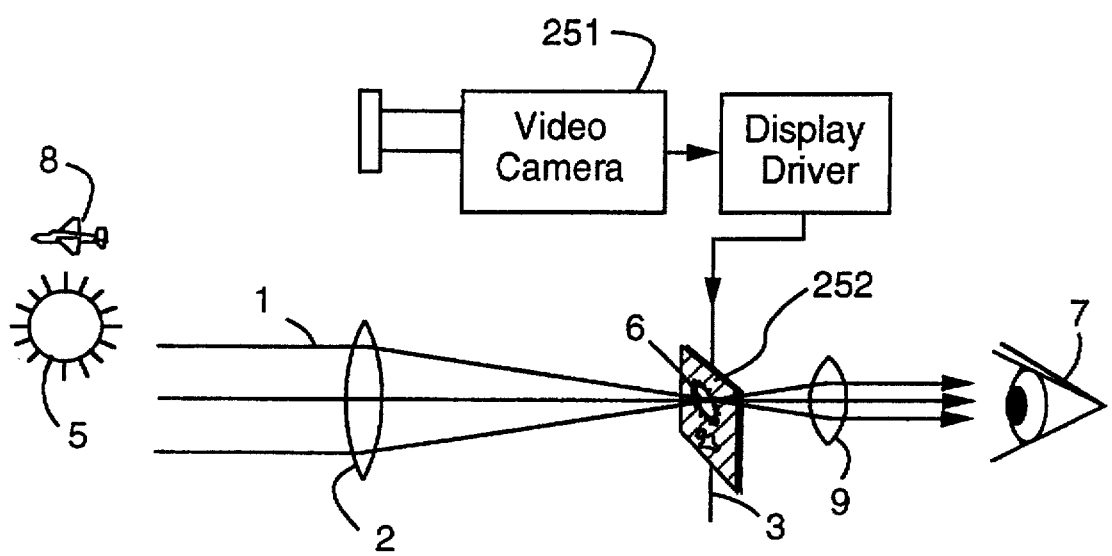
FIG. 2E describes how a video camera combined with a matrix display can operate to provide a photochromic effect.

The photochromic function can also be performed by a video camera used in combination with a liquid crystal transparent display as shown in FIG. 2E. The matrix display layer 252 is a conventional black and white liquid crystal display operating as a controllable transparency, consisting of a matrix of electrodes arranged in rows and columns and used, to control liquid crystal pixels. A twisted nematic liquid crystal could be used, with a 90 degree twist and enclosed between two plates. On the first plate, electrodes are arranged in rows. On the second plate, electrodes are arranged in columns. This whole assembly is enclosed between two polarizers with parallel polarization axes. The resulting assembly is identical to conventional liquid crystal transparency displays.

This display is driven by a signal originating from a video camera 251, such that a negative black and white image is generated: points of high intensity light in the image generate opaque pixels. A negative image could be obtained, either by electronic means such as reversing the polarity of the video signal, or by optical means, using crossed polarizers instead of parallel polarizers.

The matrix display is inserted in the focal plane of an optical system, and the negative video image on the liquid crystal is aligned with the real image produced by the optical system. In this arrangement, the negative video image behaves like a mask that selectively blocks off high intensity rays passing through the optical system. This arrangement has clear advantages over a simple video display used to eliminate glare:

1) The resulting image is three dimensional.
2) The resolution of the antiglare mask depends on the pixel size of the video system. However, the resolution of the image depends on the optical system. Clearly, image resolution is more important than mask resolution.

Alternatively other liquid crystal techniques could be used that do not need polarizers. These systems include those that absorb light such as the guest/host systems or that scatters light such as the PLCD or polymer stabilized liquid crystals.

Photochromic Systems Using Combinations Of Absorbing Dyes

Many organic chemicals such as 3,4,9,10, perylenetetracarboxylic dianhydride (PTCDA) exhibit large nonlinear optical effects. These materials are very fast (in the nano or femtosecond range). Using techniques of molecular engineering, various molecular assemblies and mixtures may be created, with properties of light sensitivity and control, tailored to the specific application. [A. Ersen, "Laser recrystallized Si/PLZT smart spatial light modulators for optoelectronics computing," Dissertation, UCSD 1992, page 19]

Photochromics Using Photoinduced Electron Transfer Chemicals

The technique described in U.S. Pat. No. 5,062,693 by Beratan and Perry (incorporated herein by reference), can be used for generating phototropic chemicals, based on an electron transfer mechanism between donor molecules and acceptor molecules. These chemical pairs can be designed with customized optical properties such as photochromism and optical activity and can be used as dopants in a matrix comprising the photochromic layer. When excited by light, the molecular system changes state temporarily and reversibly. The optical properties of the excited state differ from those of the ground state. The molecular system then decays back to its ground state thus restoring the system back to its original optical properties. The number of chemical pairs capable of this behavior is significant. Well studied donor molecules include ruthenium trisbipyridyl and phthallocyanine. Acceptor molecules include methyl viologen. These chemicals would typically be embedded in some transparent matrix material. Methods of forming these chemicals in thin sheets or films are discussed in the Beratan patent.

Use of Materials or Systems with Properties Other than Photochromic

While a photochromic system layer at the focal plane can be used in many optical instruments, material with other properties can also be used. As indicated in the background section of this specification, we shall refer to this widening in functionality by using the term "photoactive layer" to name the material at the focal plane. Thus, by photoactive we mean photochromic as well as other functions such as fluorescent and phosphorescent. Interestingly, materials or systems that reflect, defract, retard or scatter light or rotate its plane of polarization as a function of the input light intensity can be used in place of photochromic systems.

Fluorescent And Phosphorescent Materials

The photoactive layer can also be built of material such as zinc sulphide that emits visible light when illuminated by an invisible radiation [Fundamental of Photonics by Saleh and Teich, Wiley-Interscience, 1991, Page 456]. Zinc sulphide fluoresces with visible light when irradiated with ultraviolet light. This technique allows the construction of goggles capable of seeing invisible radiation such as ultraviolet light while providing the viewer with a stereoscopic perspective.

Description of Specific Embodiments

Among the several embodiments of the concept described in this invention, I shall describe rearview mirrors, and forward looking visors.

Rearview mirrors

I shall describe a few of the many design alternatives available for constructing rearview mirrors in accordance with this invention. Such devices can be made to be mounted above the windshield, in front of the driver, or on the ceiling in the center of the car, or outside to provide a side view. They could rely on several optics technologies such as refractive optics, reflective optics, Fresnel optics and microlens optics.

Figure 3A:
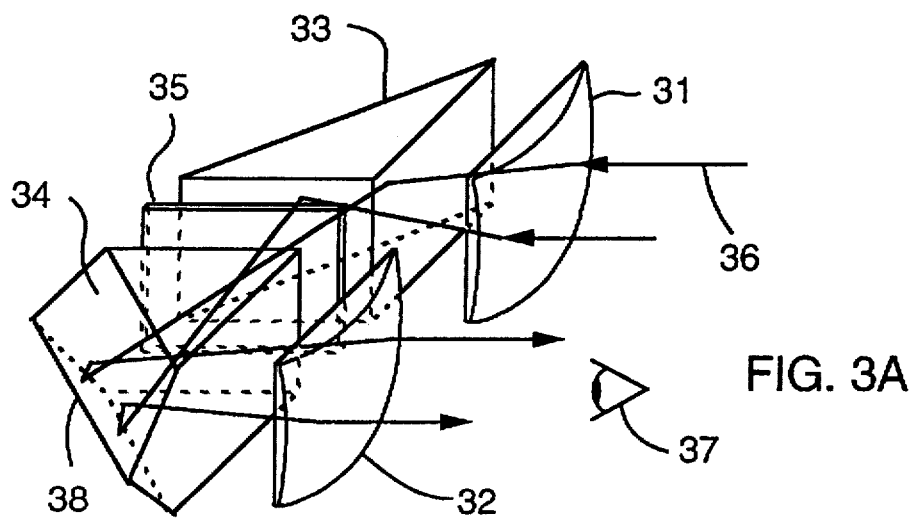
FIG. 3A shows how an element of an array for an antiglare rearview device for cars can be constructed using prisms.

FIG. 3A illustrates a single element of an optical army designed to be a rearview device that could be placed in front of the driver. It consists of two rectangular convex lenses 31 and 32, a 90 degree reflection prism 33 and a 90 degree reflection flat edge, roof prism 34 for image reinversion. It also includes a photochromic layer system 35 in the common focal plane of the two lenses, located between the prisms. Light rays 36 enter the device through the lens 31, and are reflected by prism 33. They come in focus at the photochromic layer 35. They then are reflected and inverted by the prism 34. After traversing lens 32 they exit the device and provide an upright image to a viewer 37. Lenses 31 and 32 can be simple as shown in the figure, or they can be compound to reduce aberrations and/or increase the field of view. Since the two prisms 33 and 34 are different, the optical path is asymmetrical. Therefore, if the photochromic layer is placed in the exact center of the device, the power of the input lens 31 and output lens 32 must be adjusted to insure that the focal plane coincides with the location of the photochromic material. If the input and output lenses are selected to be identical, then the focal plane does not fall exactly in the center of the device and the position of the photochromic layer must be adjusted to coincide with the focal plane.

Figure 3B:
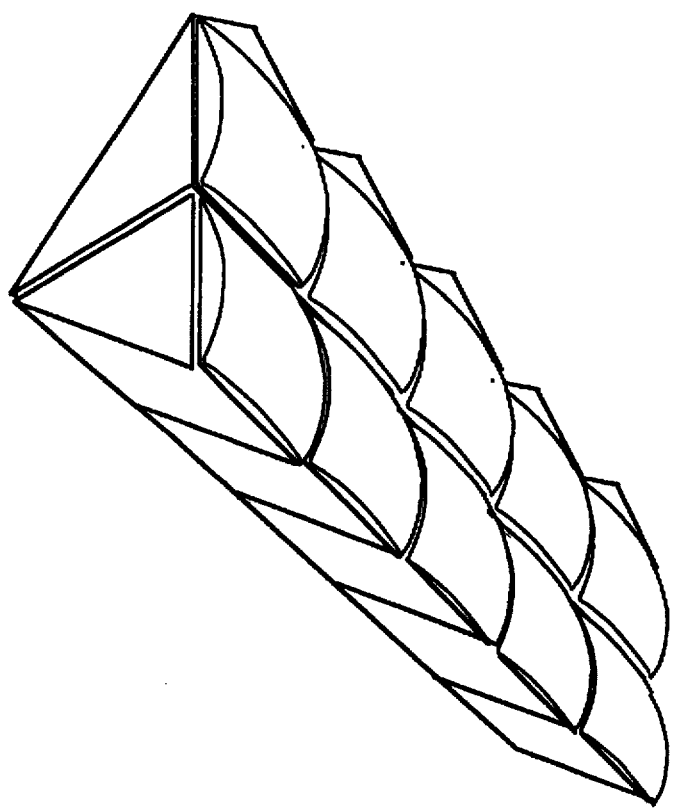
FIG. 3B demonstrates how the design in FIG. 3A can be used as an element of an optical array.

FIG. 3B illustrates how the basic device shown in FIG. 3A can be used as an element of an array incorporating a multiplicity of such devices. Each element provides a narrow field of view. The elements are positioned so that the narrow-field of view contribution to the image by each array element fuse coherently with that of other array elements to form a clear wide field image.

Figure 3C:
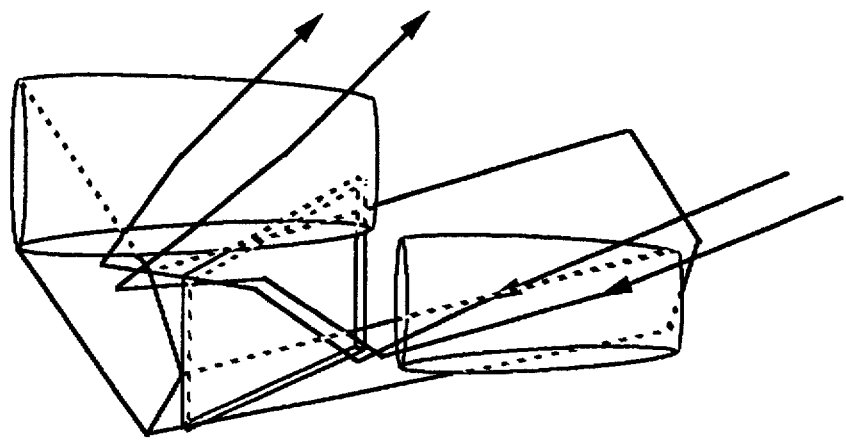
FIG. 3C illustrates how mirrors can replace prisms in the design describe in FIG. 3A.

The device described in FIG. 3C is identical to the one in FIG. 3A except that mirrors are replacing prisms.

Figure 3D:
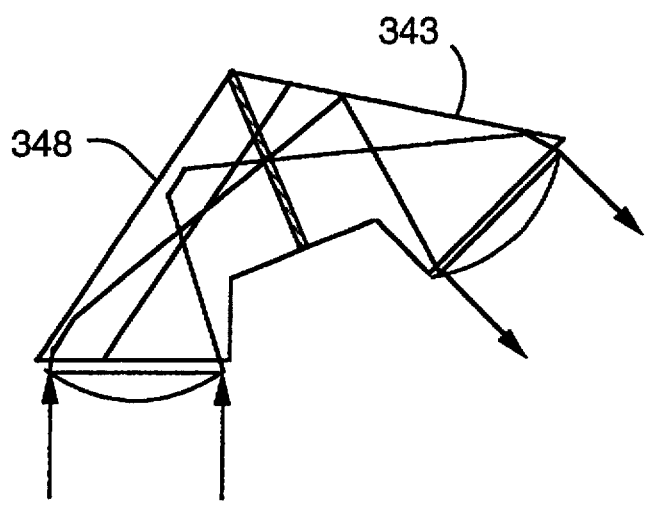
FIG. 3D shows how a side view mirror can be designed by altering the angles in the constituent prisms.

FIG. 3D describes a modification to the basic design in FIG. 3A, which allows the driver to position the rearview device on the side of the vehicle. The figure shows a top view of the device. The angle between the surface 343 and the roof 348 has been increased such that the driver can observe the rearview image at an angle of 45 degrees from the forward direction. This design represents a single element and can be stacked with other elements to form an optical array.

Figure 3E:
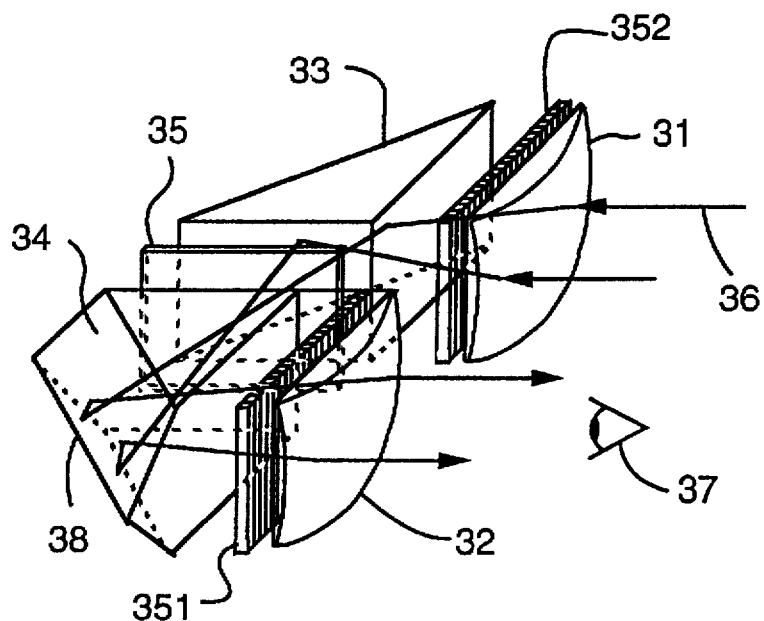
FIG. 3E shows how the basic design of FIG. 3A can be improved by adding a vane screen to stop rays with high angular deviation from the optical axis.
Figure 3F:
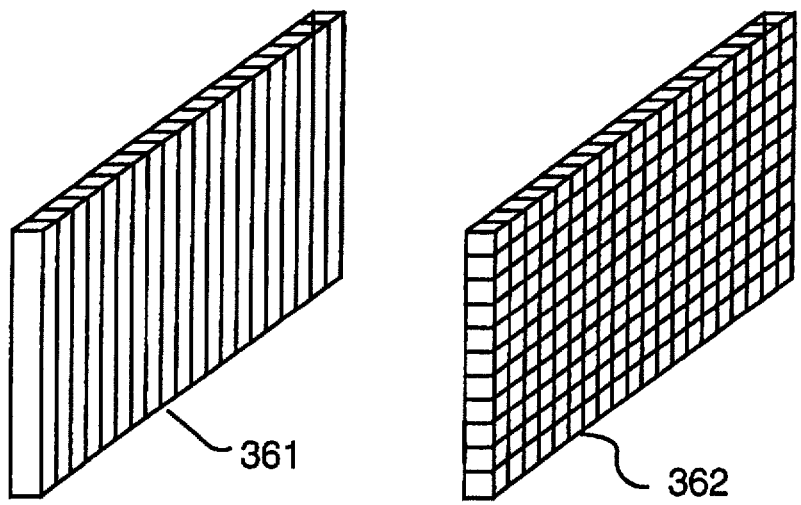
FIG. 3F shows detail of a vane screen stopping rays with high horizontal deviation, and a vane screen stopping rays with high horizontal and vertical deviation.

Rays with a high angular deviation from the optical axis can interact with the photochromic layer creating unwanted components to the antiglare mask, corresponding to secondary images. It may be desirable to stop these rays. FIG. 3E is a modification on the basic design of FIG. 3A, in which vanes 351 and 352 have been inserted behind each lens to stop rays with a high angular deviation. Two kinds of vanes are illustrated in FIG. 3F. Vanes 361 filter out rays only with high horizontal deviation. Vanes 362 filter out rays with both high horizontal and vertical deviations. These vanes could be placed either in front or behind the lenses. They comprise thin layers of opaque and non reflective material arranged in parallel strips, with the plane of each layer parallel to the optical axis. These strips could be arranged vertically or horizontally or both. More conventional baffles vanes and stops are also possible as is well known in the art of optics. Design details on baffles, vanes and stops can be found in the *Handbook of Optics*, Michael Bass Ed., McGraw Hill, 1995.

Figure 4A:
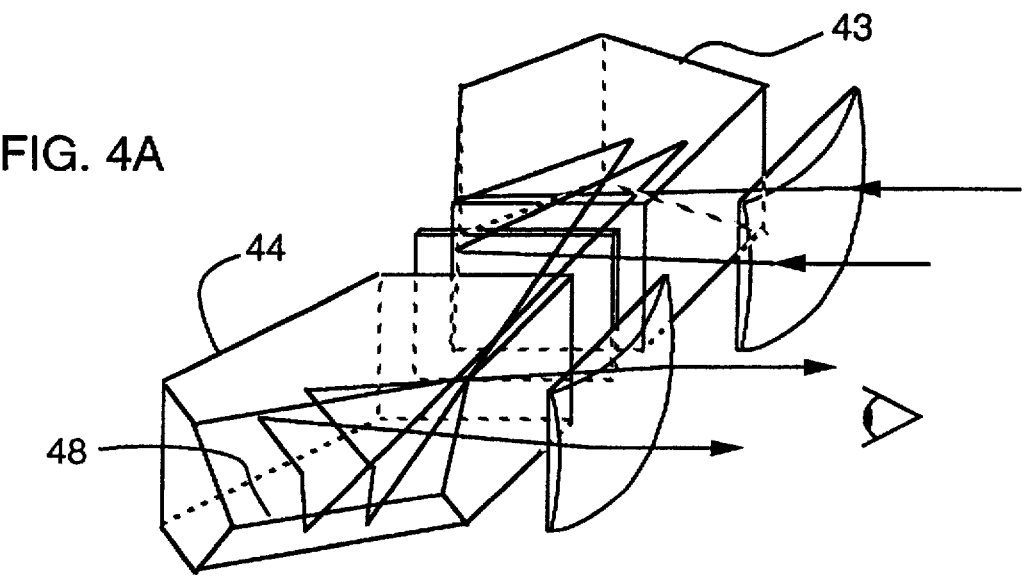
FIG. 4A describes an element of an array for a rearview device that uses a penta prism and a modified penta prism.
Figure 4B:
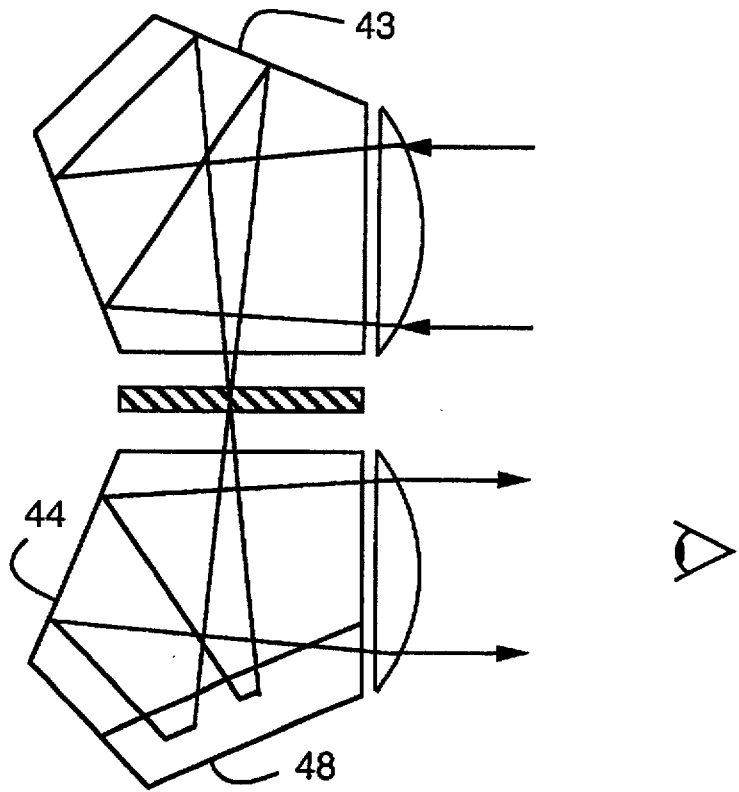
FIG. 4B is the top view of the device shown in FIG. 4A.

The device shown in FIG. 4A is identical to the one in FIG. 3A except that the prisms have been modified to achieve a longer optical path and thus avoid using lenses with low f numbers. Prism 43 is a penta prism and prism 44 is a modified penta prism which includes a roof configuration 48 to invert the image. This prism combination provides a longer optical path for light rays, at the cost of two additional reflections. The longer path is advantageous since it allows the construction of a more compact device. FIG. 4B is a top view of the device showing the penta prism 43 on top, the modified penta prism 44 on the bottom, with its roof edge 48. It is clear that as with the design shown in FIG. 3A and FIG. 3B, a multiplicity of devices presented in FIG. 4B can be arranged side-by-side in array formation to provide a wider field of view.

Use of Field Lenses to Decrease Vignetting

Figure 5A:
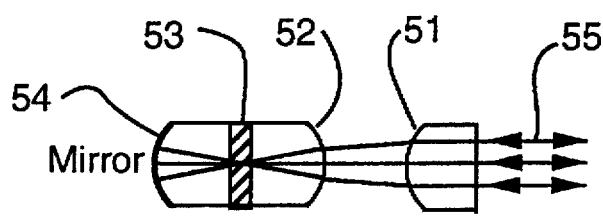
FIG. 5A illustrates a possible design using a field lens arrangement to improve operational parameters such as field of view and vignetting.
Figure 5B:
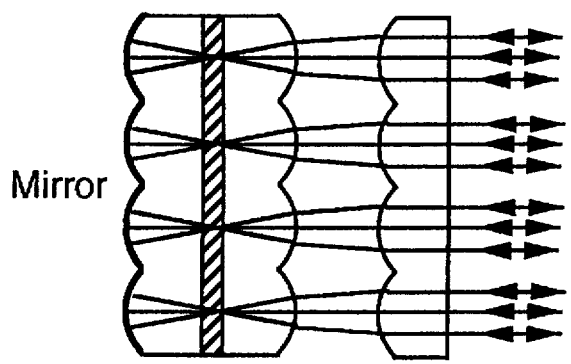
FIG. 5B shows how several devices shown in FIG. 5A can be organized in array formation to provide a wider field of view.

FIG. 5A illustrates how field lenses can be introduced in an optical system to reduce vignetting. Light rays 55 pass through a first lens 51, and a second lens 52 and reach their focal plane at 53 where a photochromic layer is located. They continue and are reflected by a concave mirror 54. The rays then traverse for a second time, the focal plane 53, lens 52 and lens 51. The rays emerging from the device appear to be reflected form a mirror that attenuates the most intense rays and leaves the dim rays unaffected. This basic device can be used singly or in array configuration as shown in FIG. 5B.

Figure 5C:
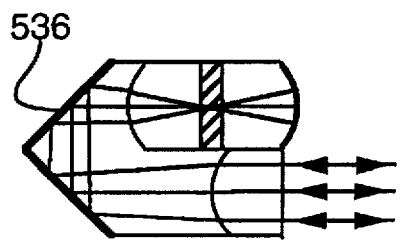
FIG. 5C describes how the optical path in FIG. 5B can be folded by means of a two mirrors intersecting at 90°.
Figure 5D:
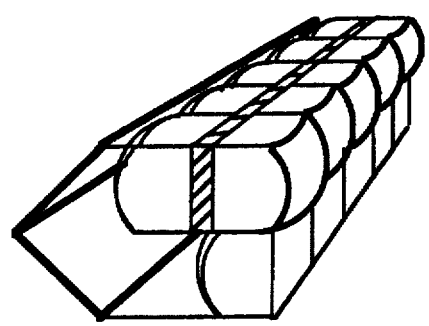
FIG. 5D demonstrates how the design in FIG. 5C can be used as an element in an optical array.
Figure 5E:
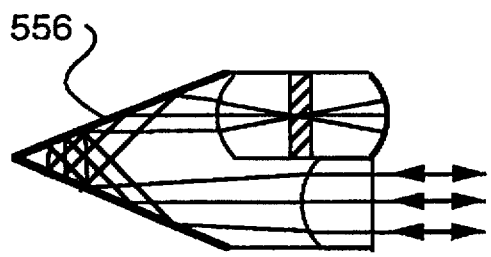
FIG. 5E illustrates how the optical path can be folded by two mirrors at 45° of each other.
Figure 5F:
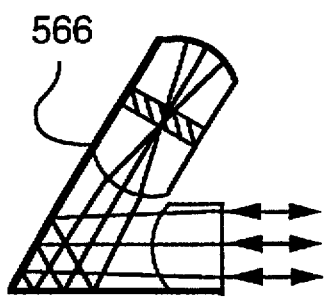
FIG. 5F shows the optical path folded by two mirrors at 60° of each other.
Figure 5G:
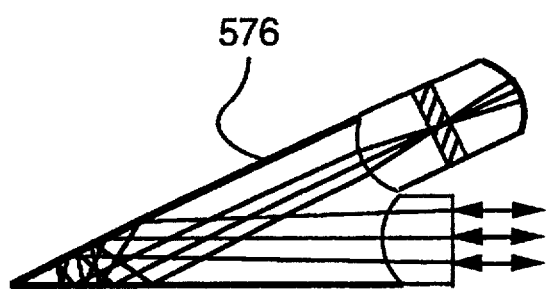
FIG. 5G describes how the optical path can be folded by two mirrors intersecting at a 30° angle.

To reduce the size of the device, the light rays in the basic device shown in FIG. 5A can be folded by means of mirrors. As shown in FIG. 5C, the mirrors 536 can be at a 90° angle, or as in FIG. 5E, the mirrors 556 can be at a 45° angle, or as in FIG. 5F, the mirrors 566 can be at a 60° angle, or as in FIG. 5G, the mirrors 576 can be at a 30° angle. Obviously many other intermediate angles are also possible. FIG. 5D shows an array of the FIG. 5C system.

Rear View Mirrors Using Reflecting Photochromic Systems

Figure 6:
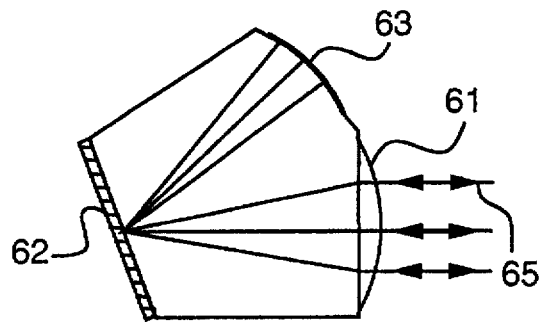
FIG. 6 illustrates an element of an array for a rearview mirror that uses a photochromic system operating in reflection mode and that employs three reflections.

FIG. 6 illustrates a system in which the rays undergo three reflections. Light rays 65 are focused by lens 61 onto focal plane 62 which contains the photochromic layer. The rays are attenuated selectively, and reflected toward a concave mirror 63 which sends them back through the optical system.

Figure 7A:
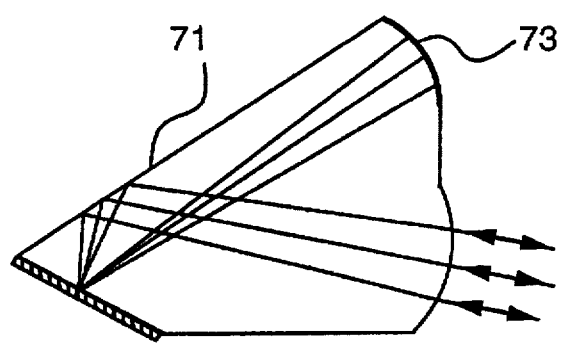
FIG. 7A describes an element of an array for a rearview mirror that uses a photochromic system operating in reflection mode and that employs five reflections.

FIG. 7A shows a system in which the rays am reflected five times. This system can be implemented by means of mirrors or, if the reflection angles are below the critical angle which is slightly larger than 45° for glass, by means of prisms. The reflecting surface 73 is concave and consists of a metallized surface. The reflecting surface 71 could be the face of a prism if the system is designed as a prism. Otherwise it could be a metallized surface.

Figure 7B:
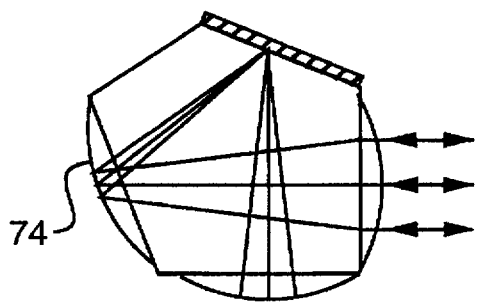
FIG. 7B shows an element of an array for a rearview mirror that uses a photochromic system operating in reflection mode, that employs five reflections, and that uses some of the internal reflectors as "field lenses".

FIG. 7B describes a system in which the rays undergo five reflections. The concave mirror 74 acts as a field lens and is used to improve the vignetting and field of view of the system.

Figure 7C:
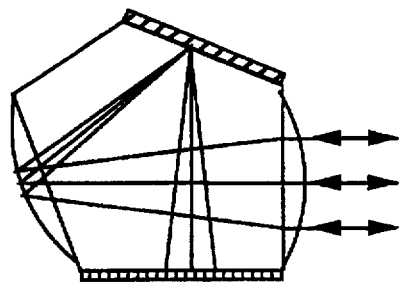
FIG. 7C illustrates how the design shown in FIG. 7B can be made more compact by means of a Fresnel lens.

FIG. 7C illustrates how the design shown in FIG. 7B can be made more compact by means of a Fresnel mirror 731. While in this particular figure, only one Fresnel lens is used, there is no theoretical reason why all lenses and mirrors could not use Fresnel optics.

Figure 7D:
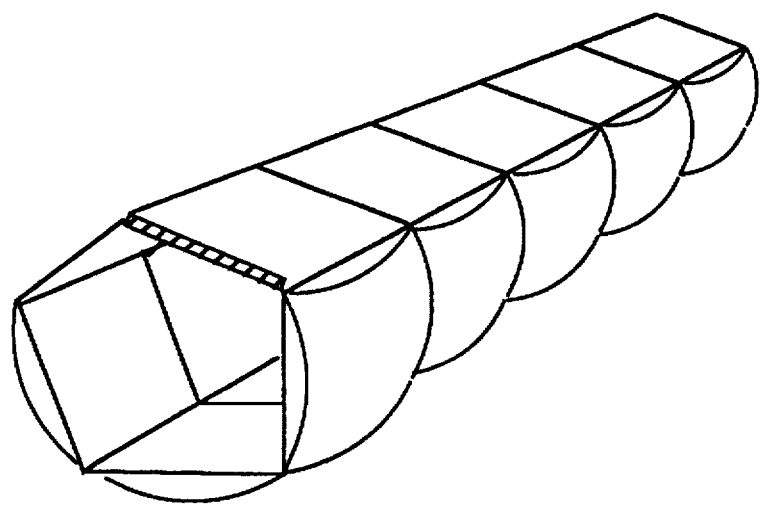
FIG. 7D demonstrates how the design in FIG. 7B can be used as an element in a unidimensional optical array.

FIG. 7D shows how a multiplicity of optical elements as the one illustrated in FIG. 7B, can be arranged in unidimensional array formation.

Figure 7E:
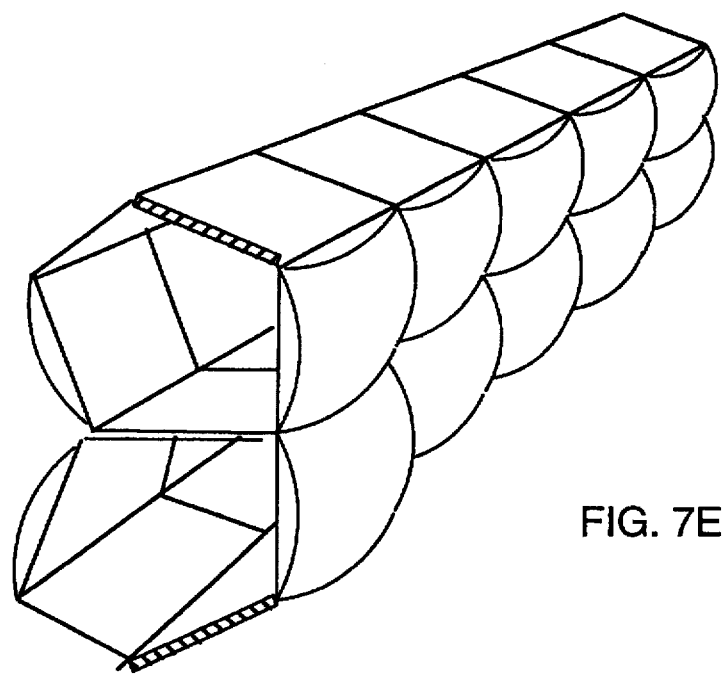
FIG. 7E illustrates how optical elements using Fresnel lenses can be assembled in a two-dimensional array.
Figure 7F:
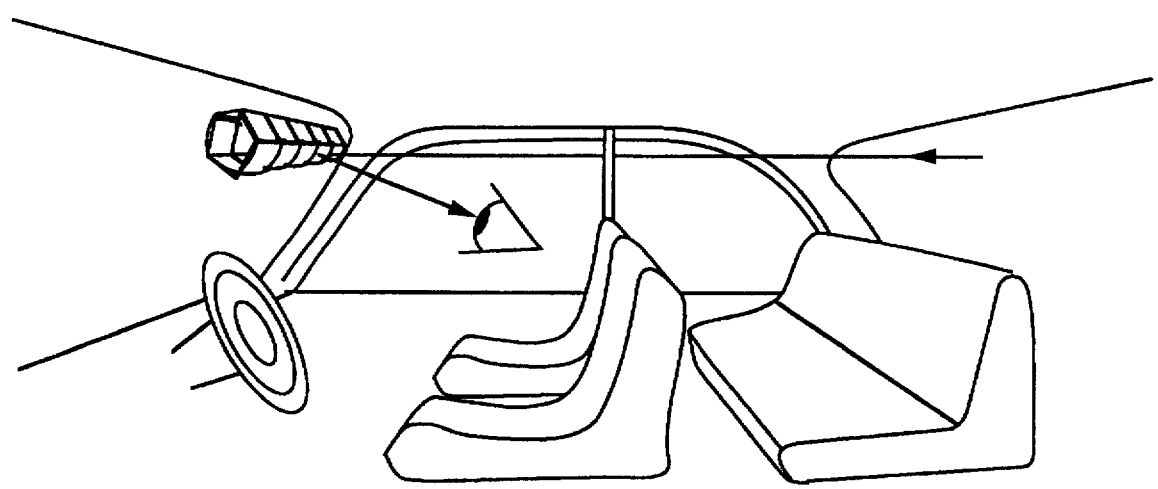
FIG. 7F provides an example of how a rearview mirror for automotive application could be implemented using the design shown in FIG. 7D.

FIG. 7E demonstrates how a multiplicity of optical elements such as the one shown in FIG. 7C can be arranged in a two-dimensional array. The use of Fresnel optics makes this assembly possible.

Figure 8A:
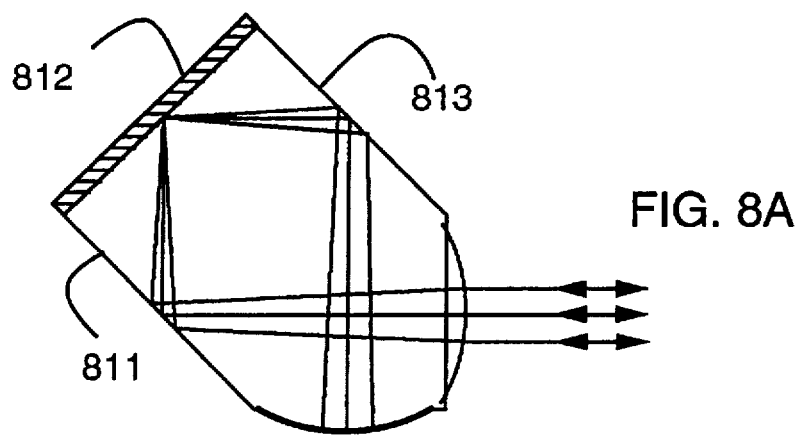
FIG. 8A illustrates an element of an array for a rearview mirror that uses a photochromic system operating in reflection mode, that employs five reflections, in which the reflections occur at an angle of about 45°, thus allowing the use of prisms.

FIG. 8A through FIG. 8D illustrate systems using seven reflections. FIG. 8A provide the basic concept for this class of design. All reflections occur at an angle of approximately 45°, which makes it possible to construct the system using prisms (assuming a critical angle for glass larger than 45°). The first 811 and third 813 reflections occur on a glass/air prism face, and therefore no metallized coating is necessary provided the light ray angles remain close to the paraxial rays. The second reflection 812 takes place at the photochromic layer. Because the index of refraction of the material composing the photochromic system is close to the index of refraction of glass, light rays can penetrate and be modulated by the photochromic system.

Figure 8B:
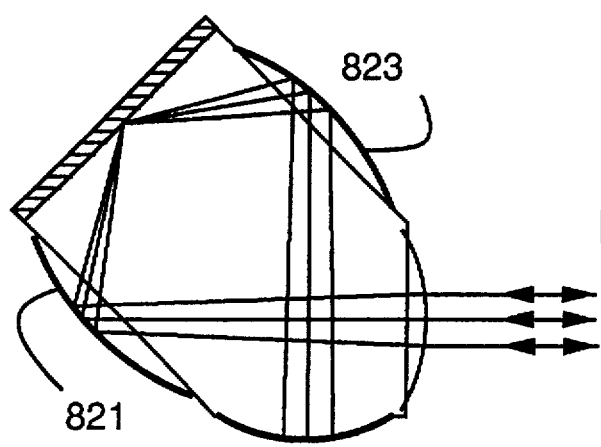
FIG. 8B is similar to FIG. 8A except that some of the internal surfaces are curved to operate as "field lenses."

FIG. 8B describes a system similar to the one in FIG. 8A except that the flat reflecting surfaces in 8A are replaced by curved surfaces 821 and 823 in 8B. If rays intersect the reflecting surfaces at an angle greater than the critical angle metallized surfaces should be used.

Figure 8C:
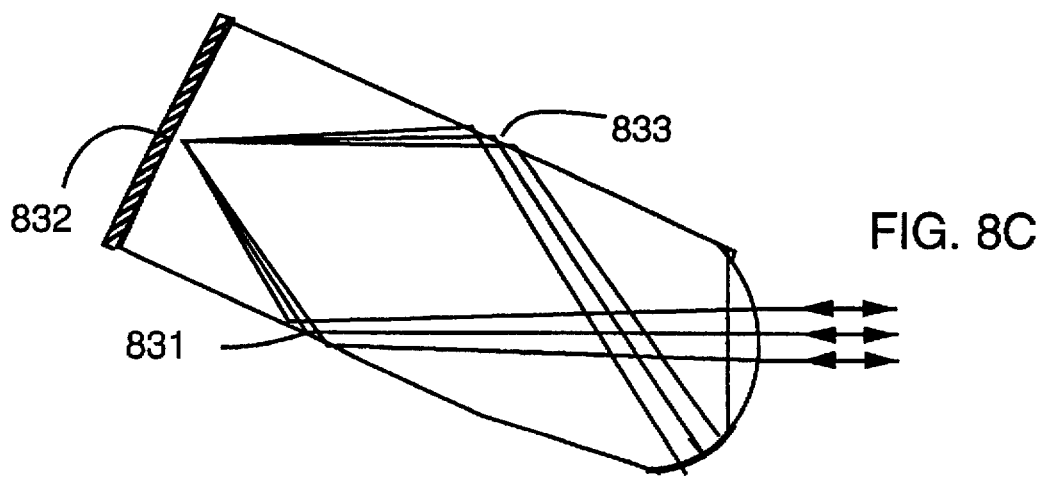
FIG. 8C is similar to FIG. 8A except that the shape is elongated to facilitate reflections when prisms are used.

The array element for a rearview mirror shown in FIG. 8C is similar to the one in FIG. 8A except that the proportions have been elongated in the horizontal direction to flatten ray angles at 831 and 833 and sharpen them at 832. This is done to ensure that, if a prism approach is used, reflection can occurs at 831 and 833 and penetration of the photochromic system can take place at 832, even with rays far from the paraxial region.

Figure 8D:
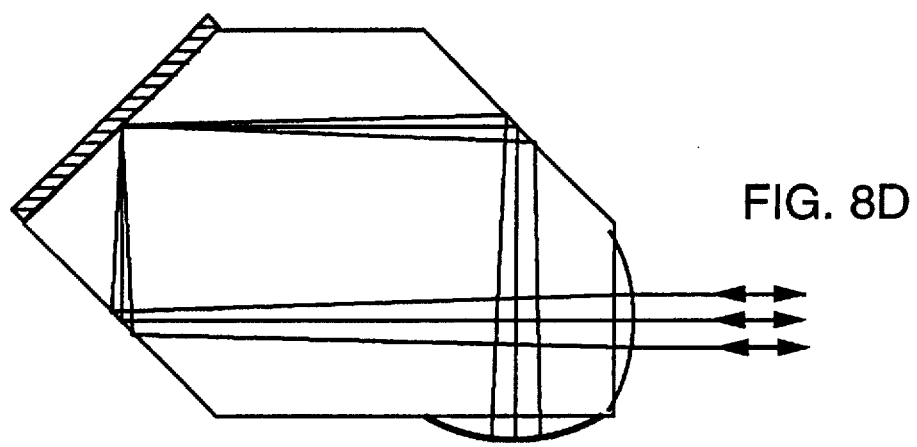
FIG. 8D is similar to FIG. 8A except that the design is elongated to conform to the particular space available in the rearview mirror mounting location.
Figure 8E:
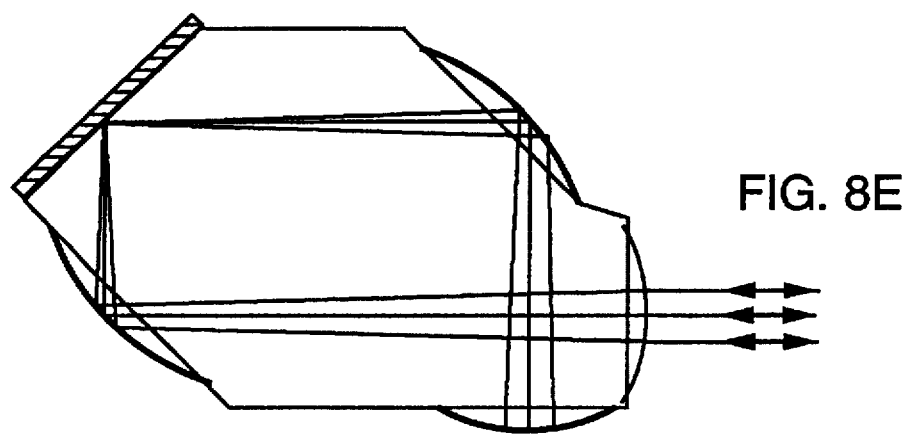
FIG. 8E is similar to FIG. 8D except that some of the internal surfaces are curved to operate as "field lenses."

The systems illustrated in FIGS. 8D and 8E are similar to those in FIGS. 8A and 8B respectively except that the horizontal light rays paths have been elongated to provide more flexibility in the optical design and conform better to the available space in cars where rearview mirrors are mounted.

As with the designs described in FIGS. 3A through 7E, the devices shown in FIG. 8A through 8E can be used as elements of an optical array.

Figure 9A:
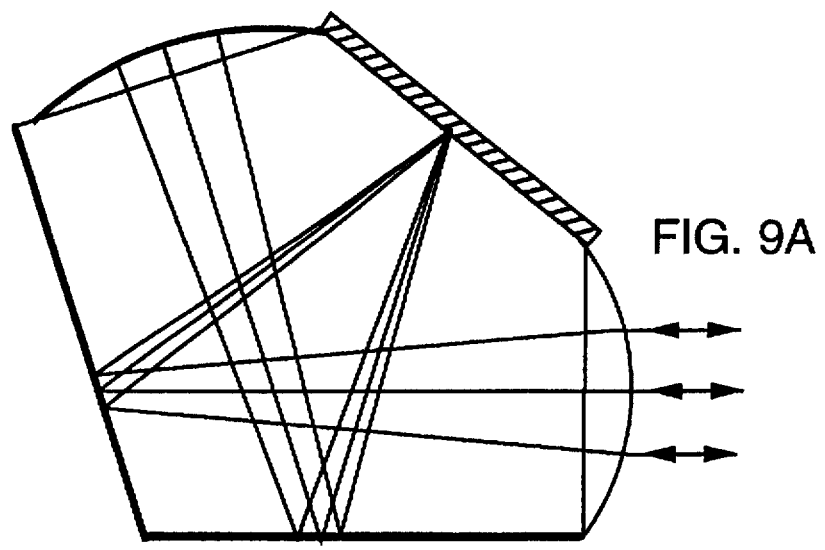
FIG. 9A illustrates an element of an array for a rearview mirror using a photochromic system operating in reflection mode, that employs seven reflections, in which the reflections occur at an angle of about 27° from the normal to the surfaces.

FIG. 9A illustrates a single element for a rearview mirror design using seven reflections. This design is more compact than the ones shown in FIG. 8A through 8E, but does not allow the use of prisms to reflect light because the angle of incidence of the rays is significantly larger than the critical angle for glass. Reflecting surfaces must be coated with metallized surfaces.

Figure 9B:
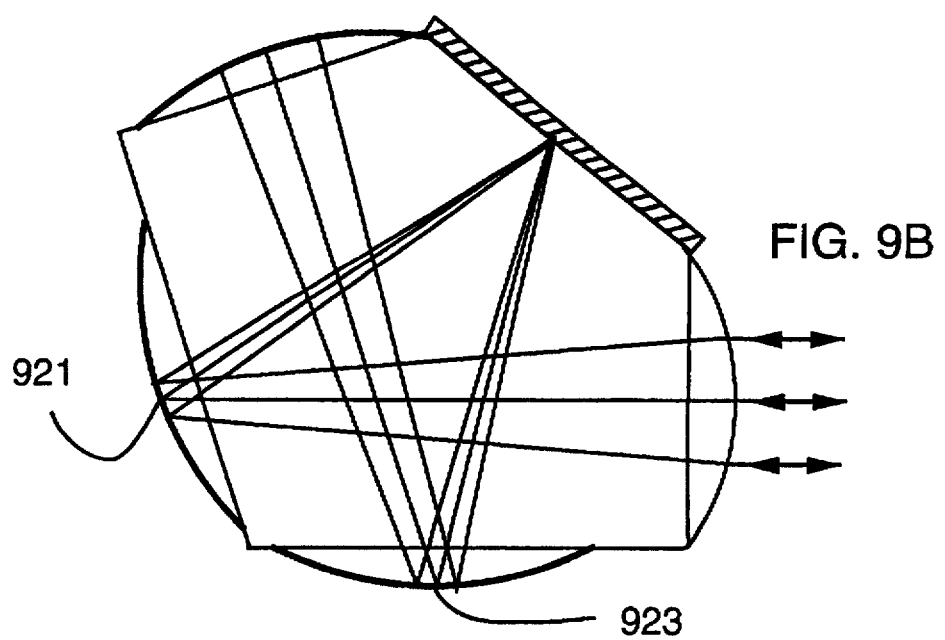
FIG. 9B is similar to FIG. 9A except that some of the internal surfaces are curved to operate as "field lenses."

FIG. 9B describes a system similar to the one shown in 9A except that the flat reflecting surfaces in 9A have been replaced by concave surfaces 921 and 923 in 9B to act as field lenses and provide better optics and reduce vignetting. The class of devices shown in FIG. 9A and 9B can also be used as elements of optical arrays.

Figure 10A:
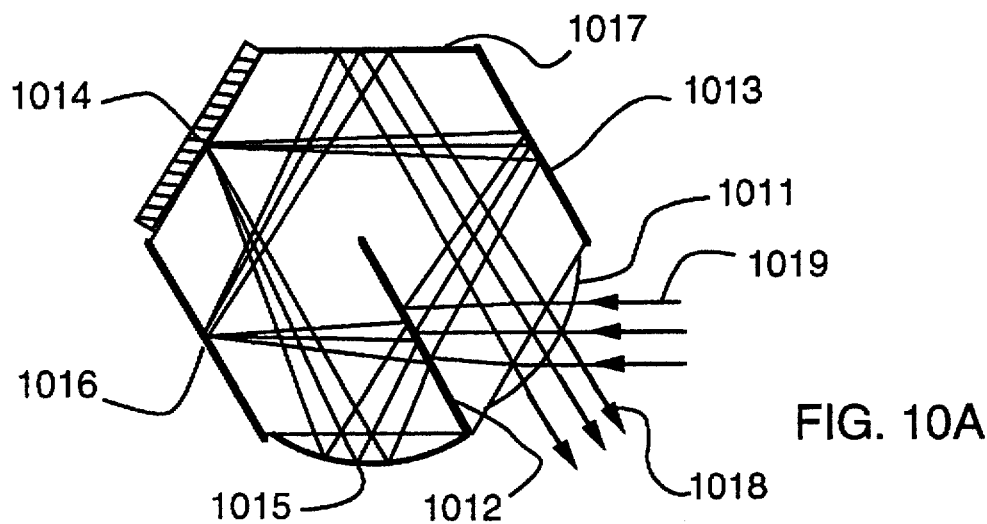
FIG. 10A describes an element of an array for a rearview mirror in which the rays are folded in an hexagonal pattern and undergo a total of seven reflections with the reflection angle of about 30° from the normal with the reflecting surfaces.

FIG. 10A illustrates a rearview mirror using an hexagonal arrangement of reflectors, that includes seven reflections. Light rays 1019 enters the system through lens 1011 and are reflected by a flat metallized surface 1012. The rays are then reflected again at 1013 and reach their focus at the photochromic system 1014. The rays are reflected selectively by the photochromic system and reach the concave reflector 1015. The rays are then reflected by the metallized layer 1012, and undergo two more reflections at 1016 and 1017. The rays 1018 then leave the optical system at an angle approximately 60° from the incoming rays 1019.

Figure 10B:
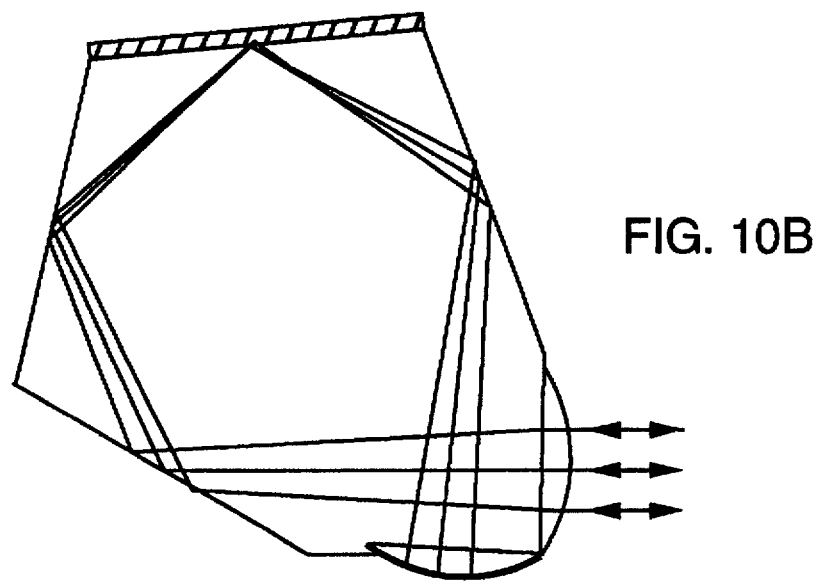
FIG. 10B describes an element of an army for a rearview mirror in which the rays are folded in an hexagonal pattern and undergo a total of nine reflections, with the reflection angle of about 60° from the normal to the reflecting surfaces.

FIG. 10B shows a rearview mirror using a hexagonal arrangement of reflectors. In this system the rays undergo a total of nine reflections. All reflection angles are below the critical air/glass critical angle, which make possible the utilization of a prism architecture. The rays can still penetrate the photochromic system because of the index of refraction of the material composing the photochromic system is close to that of glass.

Figure 10C:
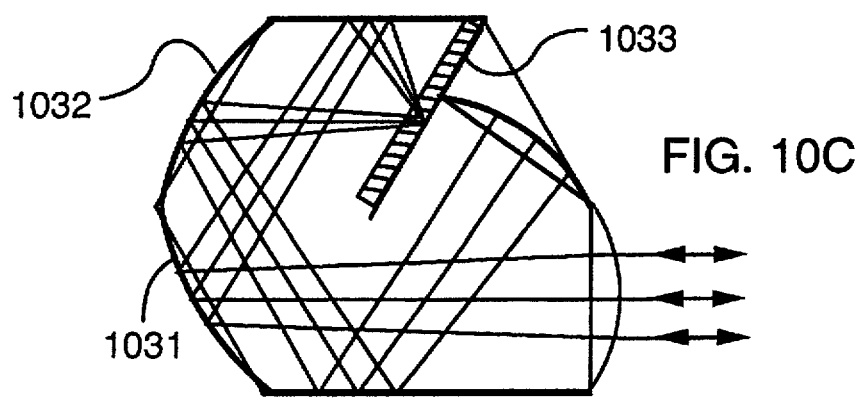
FIG. 10C describes an element of an array for a rearview mirror in which the rays are folded in an hexagonal pattern and undergo a total of eleven reflections, with the reflection angle of about 60° from the normal to the reflection surfaces, and in which some surfaces are used as "field lenses."

FIG. 10C illustrates an hexagonal arrangement of reflectors in which the rays undergo eleven reflections. The concave reflectors 1031 and 1032 operate as field lenses. The photochromic system 1033 is placed radially from the center of the polygon to one of the corners. Rays must go twice through the photochromic system. This system cannot be implemented with prisms, but its advantage over the systems in 10A and 10B is its efficiency in folding the optical path.

Figure 10D:
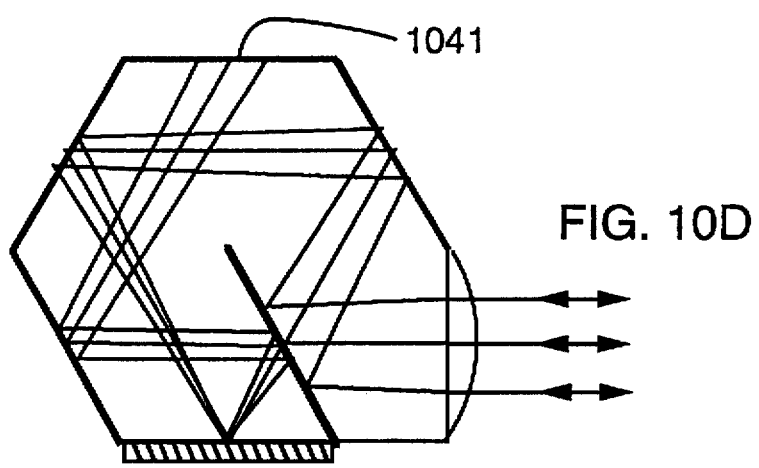
FIG. 10D describes an element of an array for a rearview mirror in which the rays are folded in an hexagonal pattern and undergo a total of thirteen reflections, with the reflection of angle about 60° from the normal to the reflecting surfaces, and in which one of the surfaces is an eccentric Fresnel mirror.

FIG. 10D shows a rearview mirror with an hexagonal arrangement of reflectors. In this system, the light rays are reflected thirteen times. Reflector 1041 is an eccentric Fresnel lens mirror which reflects the rays back at an angle and focuses them on the photochromic system.

Figure 10E:
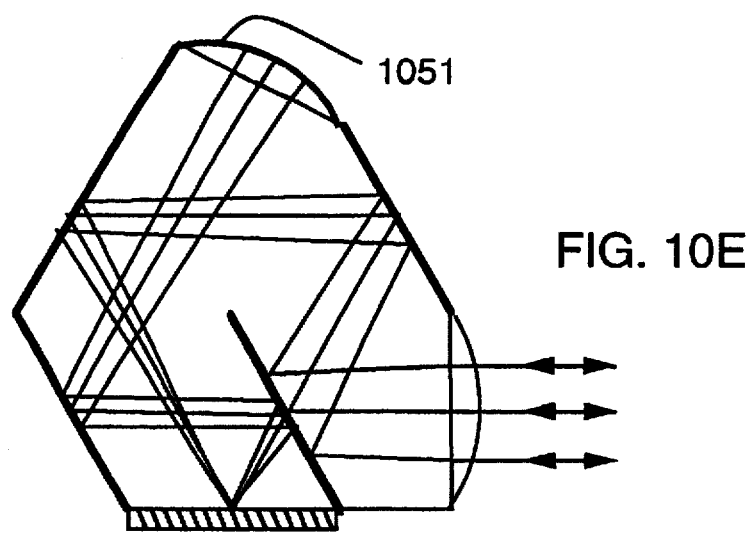
FIG. 10E describes an element of an array for a rearview mirror similar to the one in FIG. 12D except that the Fresnel mirror is replaced by a conventional curved surface.

FIG. 10E illustrates a system similar to the one in 10D except that the Fresnel lens has been replaced by a conventional concave mirror 1051. The resulting design is not as compact but can provide better quality images.

Antiglare Visors Using Optical Arrays

Figure 11A:
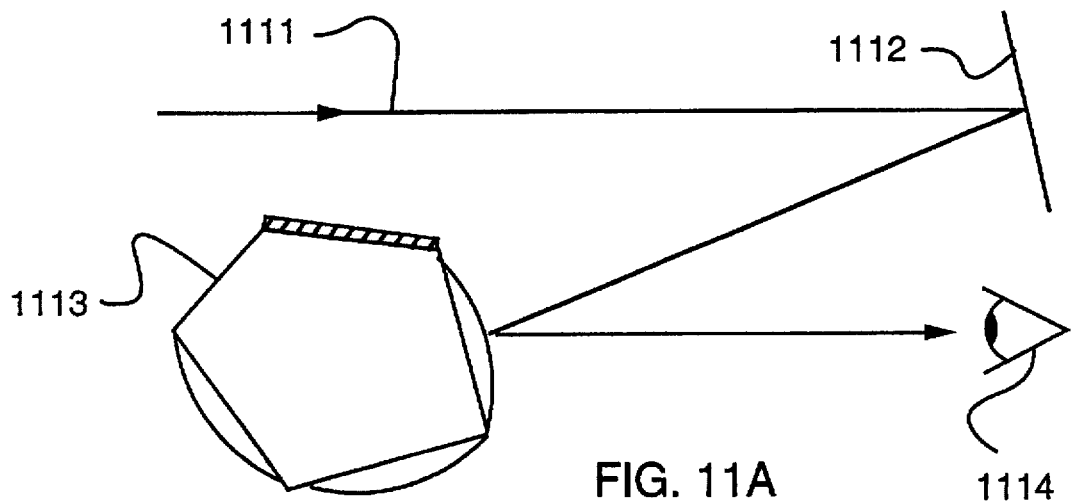
FIG. 11A illustrates how the basic reflective design shown in FIGS. 7B and 7C can be transformed by means of a mirror into a device for looking forward.
Figure 11B:
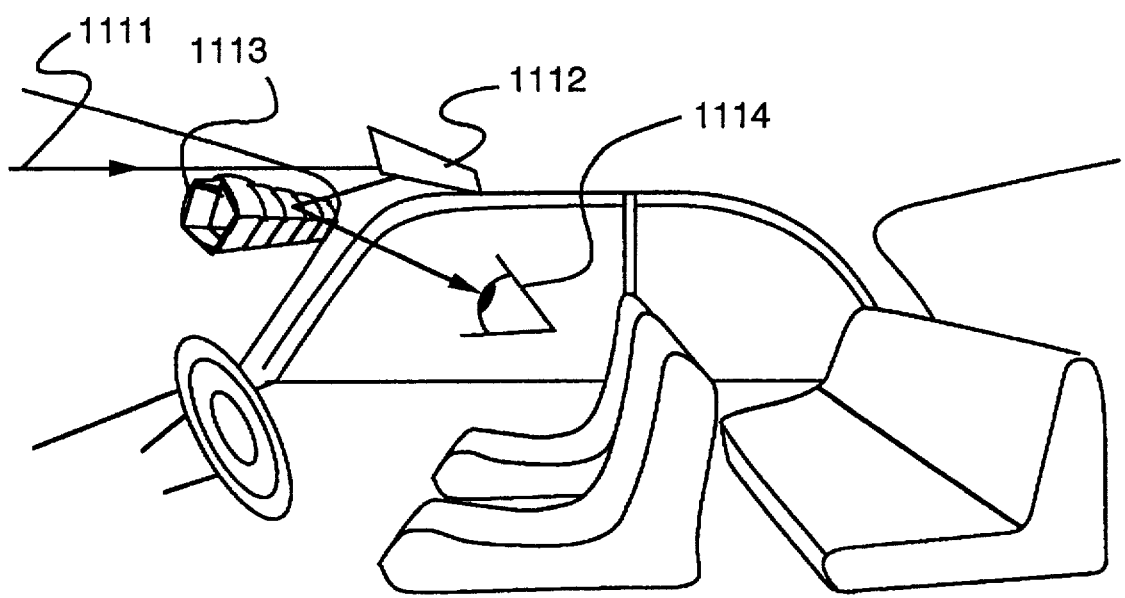
FIG. 11B shows how the forward-looking antiglare design illustrated in FIG. 11A can be used as a visor for automotive application.

FIG. 11A and 11B show how arrays of optical elements described above can be employed to provide forward looking visors for an automobile. FIG. 11 uses the same system 1113 as already described in FIG. 7D, as well as a mirror 1112. Light 1111 coming from the forward direction, is reflected by the mirror, and reflected again backward by the system 1113, toward the observer, 1114.

FIG. 11B describes the operation of this visor in an automobile.

Other Embodiments

While the above description contains many specificities, the reader should not construe these as limitations on the scope of the invention, but merely as exemplifications of preferred embodiments thereof. Those skilled in the art will envision many other possible variations within its scope. Accordingly the reader is requested to determine the scope of the invention by the appended claims and their legal equivalents, and not by the examples which have been given.

I claim:

1. An antiglare optical device for human viewing of an object field containing an intense light source said device comprising an array of optical systems, each an optical system in said array defining an optical path, and comprising
   a) a focusing optical means for focusing an image of said object field onto a focal plane,
   b) an eyepiece means for viewing a portion of said image of said object field focused onto said focal plane,
   c) a moderating photoactive layer located at said focal plane for moderating light from said intense light source,
   d) a folding means for folding said optical path
   wherein said systems in the array are aligned to permit a coherent composite view of said object field.

2. A device as in claim 1 wherein said photoactive layer means comprises a photochromic material.

3. A device as in claim 1 wherein said photoactive layer comprises a heterogeneous photoactive assembly.

4. A device as in claim 1 wherein said photoactive layer comprises a liquid crystal layer.

5. A device as in claim 1 wherein said photoactive layer comprises a guest/host liquid crystal layer.

6. A device as in claim 1 wherein said photoactive layer comprises absorbing dyes.

7. A device as in claim 1 wherein said photoactive layer comprises electron transfer chemicals.

8. A device as in claim 1 wherein said photoactive layer comprises a liquid crystal display operating in a transparency mode, and further comprising a video signal generator for producing light absorbing images on said display, of intense light sources in said object field.

9. A device as in claim 8 wherein the video image generated is aligned with, and is the negative of, the image focused by said objective means.

10. A device as in claim 1 wherein said focusing optical means comprises at least one field lens near said focal plane in order to increase the field of view of said device.

11. A device as in claim 1 wherein said focusing optical means and said eyepiece means together comprise at least one compound lens.

12. A device as in claim 1 wherein said focusing optical means and said eyepiece means together comprise at least one Fresnel optical component.

13. A device as in claim 1 wherein said folding means comprise at least one prism.

14. A device as in claim 1 wherein said folding means comprise at least one mirror.

15. A device as in claim 1 and further comprising a deflecting means for deflecting input rays, to provide a first mode of operation wherein rays from a forward direction enter said device, and a second mode wherein rays coming from a backward direction enter said device.

16. A device as in claim 1 and further comprising a mounting means for mounting said device into the ceiling of a vehicle, to permit a driver of the vehicle to view rearward of the vehicle in the manner permitted by a conventional rearview mirror.

17. A device as in claim 1 and further comprising an electrical adjusting means for adjusting the operation of said photoactive layer by means of an electrical input.

18. A device as in claim 1 and further comprising baffles for stopping rays with high angular deviation from the optical axis.

19. A device as in claim 1 wherein said device is fabricated in the shape of a rearview mirror.

20. A device as in claim 1 wherein said photoactive layer comprises a scattering means for scattering light as a function of said light input intensity.

21. A device as in claim 20 wherein said light scattering means comprises a polymer stabilized liquid crystal.

22. A device as in claim 20 wherein said light scattering means comprises a polymer-dispersed liquid crystal.

23. A device as in claim 20 wherein said light scattering means comprises a liquid crystal dispersed polymer also called liquid crystal gel.

24. A device as in claim 1 wherein said photoactive layer comprises a reflecting means for reflecting light as a function of said light input intensity.

25. A device as in claim 24 wherein said reflective means comprises a transparent electrode layer, a liquid crystal, a photoconducting material and an electrode layer.

26. A device as in claim 25 wherein said photoactive layer comprises a dielectric mirror.

27. A device as in claim 25 wherein said dielectric mirror is semitransparent.

28. A device as in claim 1 wherein the magnification is other than unity.

29. A device as in claim 1 wherein said image is intentionally distorted.

30. A device as in claim 1 wherein said photoactive layer comprises a photoconductor material.

31. A device as in claim 1 wherein said device comprises an optical filter for preventing harmful radiation from damaging sensitive materials in the antiglare device.

32. A device as in claim 5 and further comprising at least one pleochroic dye.

33. A device as in claim 1 wherein said device is fabricated in the shape of a forward-looking visor.

34. An antiglare optical device for human viewing of an object field containing an intense light source said device comprising an array of optical systems each optical system in said array defining an optical path, and comprising:

a) a focusing and viewing optical system for focusing an image of said object field onto a focal plane and for viewing of a portion of said image of said object field focused on said focal plane, b) a moderating photoactive layer located at said focal plane for moderating light from said intense light source, and c) a mirror means for reflecting light from said object field for a return path through said focusing and viewing optical system wherein said system in the array are aligned to permit a composite view of said object field.

* * * * *